(12) United States Patent
Ulbrich-Gasparevic et al.

(10) Patent No.: US 9,463,877 B2
(45) Date of Patent: Oct. 11, 2016

(54) MOUNTING DEVICE FOR SUSPENDING A VISUAL BARRIER OF A PASSENGER CABIN OF A MEANS OF TRANSPORT

(75) Inventors: Jovan Ulbrich-Gasparevic, Pinneberg (DE); Michael Mosler, Plaisance du Touch (FR)

(73) Assignee: AIRBUS OPERATIONS GMBH, Hamburg (DE)

(*) Notice: Subject to any disclaimer, the term of this patent is extended or adjusted under 35 U.S.C. 154(b) by 956 days.

(21) Appl. No.: 13/284,366

(22) Filed: Oct. 28, 2011

(65) Prior Publication Data

US 2012/0273613 A1 Nov. 1, 2012

Related U.S. Application Data

(60) Provisional application No. 61/408,278, filed on Oct. 29, 2010.

(30) Foreign Application Priority Data

Oct. 29, 2010 (DE) .......................... 10 2010 050 108

(51) Int. Cl.
*B64D 11/00* (2006.01)
(52) U.S. Cl.
CPC ...... *B64D 11/0023* (2013.01); *Y10T 29/49826* (2015.01)
(58) Field of Classification Search
CPC ................................................ B64D 11/0023

USPC ........... 244/118.1, 118.5, 121, 129.4; 52/29; 160/330, 368.1; 49/153, 158, 176
See application file for complete search history.

(56) References Cited

U.S. PATENT DOCUMENTS

| | | | |
|---|---|---|---|
| 6,382,297 B1* | 5/2002 | Takizawa et al. | 160/330 |
| 6,523,779 B1* | 2/2003 | Michel | 244/118.5 |
| 6,564,851 B1* | 5/2003 | Liao | 160/330 |
| 7,530,529 B2* | 5/2009 | Bock | 244/118.5 |
| 2009/0242147 A1 | 10/2009 | Breuer et al. | |
| 2009/0242149 A1 | 10/2009 | Breuer et al. | |
| 2011/0011976 A1* | 1/2011 | Goehlich et al. | 244/118.5 |

FOREIGN PATENT DOCUMENTS

| | | |
|---|---|---|
| DE | 102008016420 B3 | 9/2009 |
| DE | 102008016419 A1 | 10/2009 |

OTHER PUBLICATIONS

German Office Action dated Jun. 7, 2011 for German Application No. 102010050108.5.

* cited by examiner

*Primary Examiner* — Rob Swiatek
(74) *Attorney, Agent, or Firm* — Ingrassia Fisher & Lorenz, P.C.

(57) ABSTRACT

A mounting device for a visual barrier of two areas of a passenger cabin of a transport. The mounting device provides an enlarged visual range in the cabin when the barrier is not used. The mounting device includes, but is not limited to a mounting module that is adapted for being inserted in a luggage compartment.

16 Claims, 11 Drawing Sheets

MOUNTING DEVICE FOR SUSPENDING A VISUAL BARRIER OF A PASSENGER CABIN OF A MEANS OF TRANSPORT

CROSS-REFERENCE TO RELATED APPLICATIONS

This application is a continuation of the German Patent Application No. 10 2010 050 108.5 filed on Oct. 29, 2010, and of the U.S. Provisional Patent Application No. 61/408,278 filed Oct. 29, 2010, the disclosures of which applications is hereby incorporated herein by reference.

TECHNICAL FIELD

The technical field relates to visually separating two areas of a passenger cabin of a means of transport. In particular, the technical field relates to a mounting device for mounting a visual barrier of two areas of a passenger cabin of a means of transport, to a luggage compartment for a passenger cabin of a means of transport with such a mounting device, to a means of transport, and to a method for mounting a visual barrier.

BACKGROUND

Mounting devices for mounting a visual barrier of two areas of a passenger cabin of a means of transport are also known as curtain headers and are used, for example in an aircraft cabin, to receive a curtain. In this case the mounting devices comprise a curtain rail or curtain rod that is arranged between two overhead luggage compartments. The mounting device for the curtain is also designated a header panel; it can comprise panels that cover up a space between the curtain rail and the cabin ceiling on both sides at least to the upper edge of the curtain.

The mounting device is thus in a position to close the gap between the upper edge of the curtain and the ceiling. The movement space of the curtain may be limited to the length of the affixed curtain rail. In its open state the curtain may be gathered on one side by means of press studs or magnets.

The gathered curtain may still be visible and may often be aesthetically not very pleasing. Moreover, a gathered curtain may have to be stowed away in such a manner that an emergency exit is not impeded in the case of an evacuation. In addition, it may have to be ensured that the gathered curtain does not cover up any functional visual components, for example monitors of the on-board entertainment (in-flight entertainment, IFE) system.

Furthermore, the contour of the mounting device may stand out markedly from the ceiling contour, and the design space for the stowed-away curtain in the area of the partitions and monuments may not be used for other purposes, and consequently, for example, affixation of a baby bassinet may be rendered difficult or even impossible.

DE 10 2008 016 420 A1 and US 2009/0242147 A1 describe known embodiments of a mounting device for an aircraft, which mounting device is arranged between the overhead luggage compartments.

In view of the foregoing, it is at least one object to state a system for a visual barrier within a passenger cabin of a means of transport, which system provides an enlarged visual range in the cabin when the barrier is not used. In addition, other objects, desirable features, and characteristics will become apparent from the subsequent summary and detailed description, and the appended claims, taken in conjunction with the accompanying drawings and this background.

SUMMARY

Stated are a mounting device for mounting a visual barrier of two areas of a passenger cabin of a means of transport, a luggage compartment for a passenger cabin of a means of transport, a means of transport, and a method for mounting a visual barrier of two areas of a passenger cabin of a means of transport, according to the characteristics of the independent claims.

According to a first embodiment, a mounting device for mounting a visual barrier of two areas of a passenger cabin of a means of transport is stated, which mounting device comprises a rail, a mounting module, and a coupling device. The mounting module is designed for mounting the visual barrier and is movably attached to the rail by means of the coupling device so that said mounting module is designed for carrying out a sliding movement from a retracted position along a longitudinal axis of the rail. Furthermore, the mounting module is designed, by means of the coupling device, to carry out a movement after sliding, which movement does not take place along the longitudinal axis of the rail, and which movement leads to an extended position of the mounting module.

In other words the mounting module can be moved from its retracted position to its extended position., In a first movement phase lateral sliding of the mounting module along the rail takes place, and in a second movement phase, which follows on from the first movement phase, movement of the mounting module in another direction takes place which, for example, comprises a vertical component (i.e., in positive Z-direction). This second movement after sliding can, for example, be a kind of rotary movement on the coupling device. The z-direction is the direction of the z-axis, i.e., the vertical axis, of the aircraft. To this effect the coupling device can, for example, comprise two rotation axes by way of which it is in each case attached to its rail slide or to the mounting module.

According to an embodiment, the mounting module comprises a curtain rod or curtain rail along which the visual barrier is slidable. Moreover, for example, lateral panels can be provided which close the gap between the curtain rail and the ceiling.

According to a further embodiment, the coupling device comprises a first area that is designed for holding the coupling device to the rail and for guiding the coupling device along the rail when the sliding movement takes place. This first area may be a rail slide that can run along the rail, inside it.

Furthermore, the coupling device comprises a second area that is, for example, arranged on the second end of the coupling device and that is designed for pivotably holding the mounting module to the coupling device.

According to a further embodiment, the coupling device comprises two pivot joints that make it possible for the mounting module to move after sliding. The first pivot joint can, for example, provide the connection between the first area of the coupling device and the center part of the coupling device, and the second pivot joint can, for example, provide the connection between the coupling device and the mounting module.

According to a further embodiment, the mounting device comprises a first arresting element and a second arresting element for affixing the mounting module to one or several components of the passenger cabin when the mounting module is in its extended position.

According to a further embodiment, a luggage compartment for a passenger cabin of a means of transport is stated, which luggage compartment comprises one or several of the mounting devices described above and below.

According to a further embodiment, the rail of the mounting device is (or the rails of the mounting devices are) integrated in the luggage compartment. Thus, the mounting devices can be slid into the luggage compartment.

According to a further embodiment, the rail or the rails is/are attached to an upper area of the luggage compartment.

According to a further embodiment, the entire mounting device or the entire mounting devices in its/their retracted position/s is/are located within the luggage compartment. In other words, when the visual barriers are not to be used, the mounting devices can thus be fully retracted into the hatrack. Likewise, the curtain can be stowed away in the luggage compartments.

According to a further embodiment, the luggage compartment, also called hatrack comprises a closable opening through which the mounting module is moved from its retracted position within the luggage compartment to its extended position. If several mounting modules are provided, the luggage compartment comprises several such closable openings. According to a further embodiment, the closable opening comprises a sliding door for closing the opening.

According to a further embodiment, the luggage compartment is designed as a center overhead luggage compartment intended for arrangement between two aisles of the passenger cabin. For each of the two aisles the luggage compartment comprises a mounting device of its own.

According to a further embodiment, a means of transport is stated comprising one or several mounting devices described above and below, and/or comprising one or several luggage compartments described above and below. The means of transport is, for example, an aircraft, a water craft, a rail vehicle or a road vehicle. In particular, it can be an airplane or a helicopter.

According to a further embodiment, a method for mounting a visual barrier of two areas of a passenger cabin of a means of transport by means of a visual barrier affixed to a mounting device described above and below is stated. The method comprises sliding the mounting module from a retracted position along a longitudinal axis of the rail. Subsequently, movement of the mounting module to an extended position along a direction that does not extend along the longitudinal axis of the rail takes place. After completion of this movement the mounting module can then be affixed in its extended position, e.g., in that it is attached to devices or to the load-bearing structure of the passenger cabin.

At this point it should be pointed out that the characteristics described above and below may apply to the mounting device, to the luggage compartment, to the means of transport and to the method. In other words, many characteristics which hereinafter are, for example, described with regard to the mounting device, the luggage compartment or the means of transport can also be implemented as corresponding method-related steps, and vice-versa.

Below, exemplary embodiments of the invention are described with reference to the figures.

BRIEF DESCRIPTION OF THE DRAWINGS

The present invention will hereinafter be described in conjunction with the following drawing figures, wherein like numerals denote like elements, and the figures are diagrammatic and not to scale, and.

DETAILED DESCRIPTION

The following detailed description is merely exemplary in nature and is not intended to limit application and uses. Furthermore, there is no intention to be bound by any theory presented in the preceding background or summary or the following detailed description of the invention.

Figure 1:
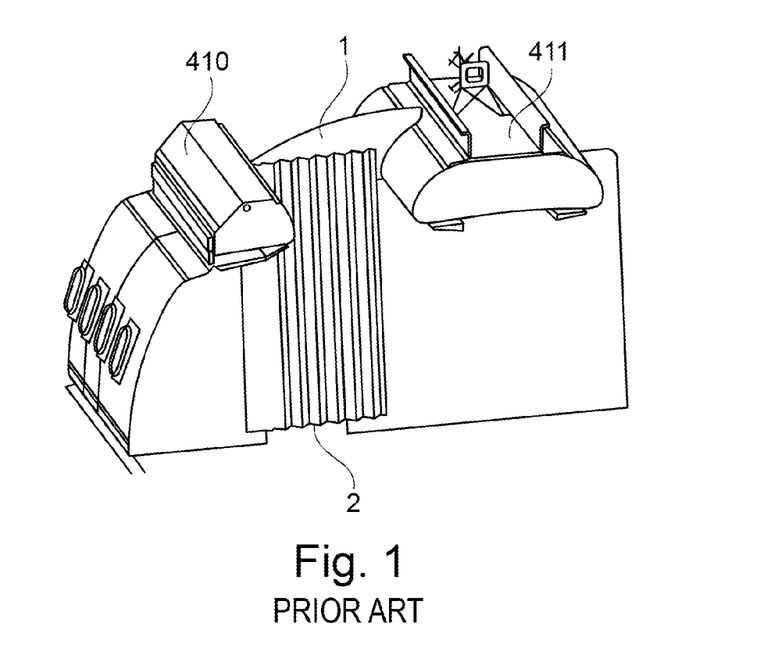
FIG. 1 shows a part of a known passenger cabin of an aircraft.

FIG. 1 shows a section of a passenger cabin of an aircraft with an overhead luggage compartment or hatrack 410 (lateral hatrack) affixed to the port side, with an overhead hatrack 411 (center hatrack) in the passenger cabin, and with a visual barrier of the passenger cabin, which visual barrier is arranged between the aforesaid. The visual barrier 1 comprises a mounting device and a curtain 2 hanging from it.

Figure 2:
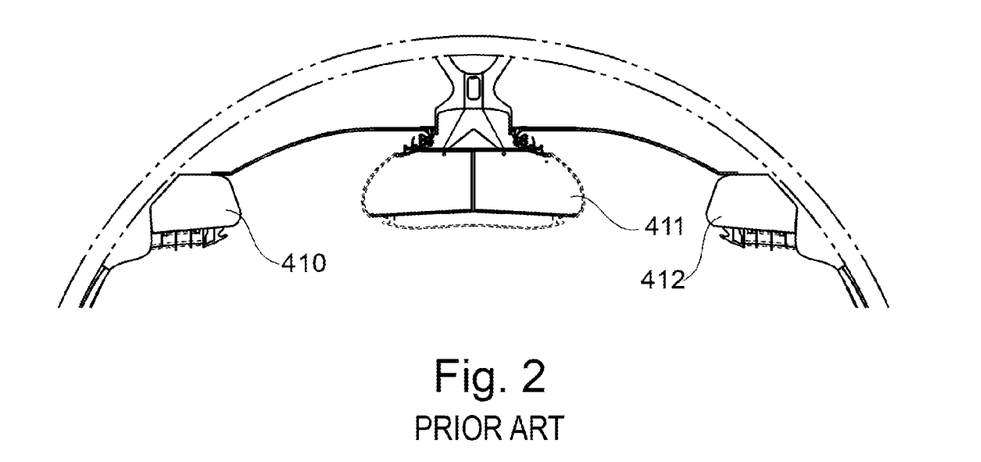
FIG. 2 shows a further view of part of a known passenger cabin of an aircraft.

FIG. 2 shows a further view of an area of a passenger cabin with a hatrack 410 arranged on the port side, with a center hatrack 411, and with a hatrack 412 arranged on the starboard side.

Depending on the location of installation, different overhead hatrack variants may be provided. Hatracks are known which are affixed to the port side or to the starboard side of the passenger cabin (so-called lateral hatracks). Moreover, hatracks are known that are installed in the center of the cabin (so-called center hatracks). Furthermore, there can be a differentiation depending on the required design size of the hatrack. For example, hatracks are known which extend over one frame element, two frame elements or four frame elements. For each design length of the means of transport, for example of an aircraft, different hatracks can be provided. In addition, apart from the above, door spacer parts can be provided that are used for compensation of the space between the individual hatracks in longitudinal direction of the cabin, and which are used to provide a uniform appearance of the row of hatracks. Additional supplementary elements can be installed to provide a visual barrier and a light barrier in the curtain header area.

Figure 3:
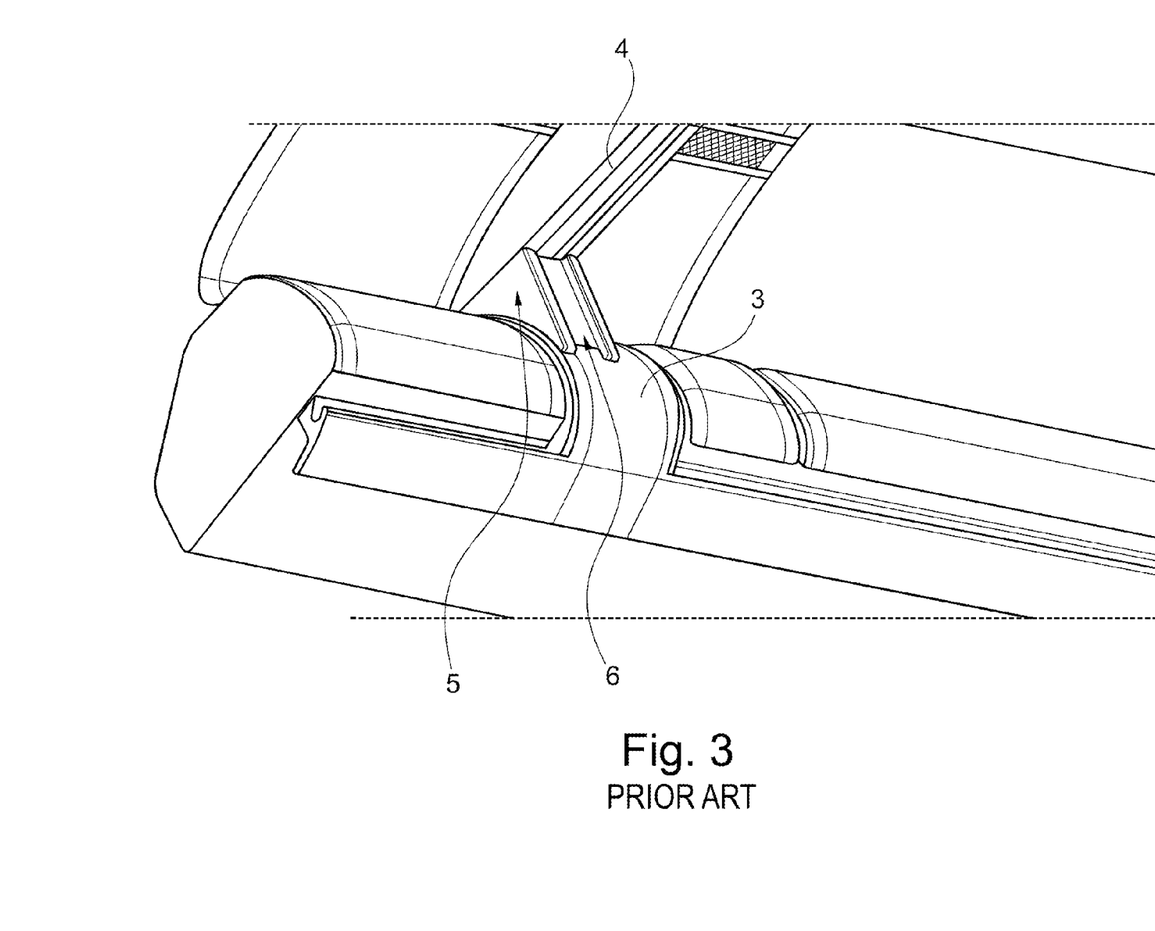
FIG. 3 shows a known spacer that is arranged between two overhead luggage compartments.

FIG. 3 shows a spacer 3 that is situated between two hatracks. Furthermore, an installation element 5 in the form of a visual delimitation is provided that fills in the open area between a curtain and the cabin installations and that can be connected to the spacer 3. Moreover, a curtain rail 4 is provided.

The installation element 5, which is located above the spacer 3 and below the curtain rod 4, is used for additional visual delimitation and comprises a slit arrangement or recess 6 that can receive the curtain.

Figure 4A:
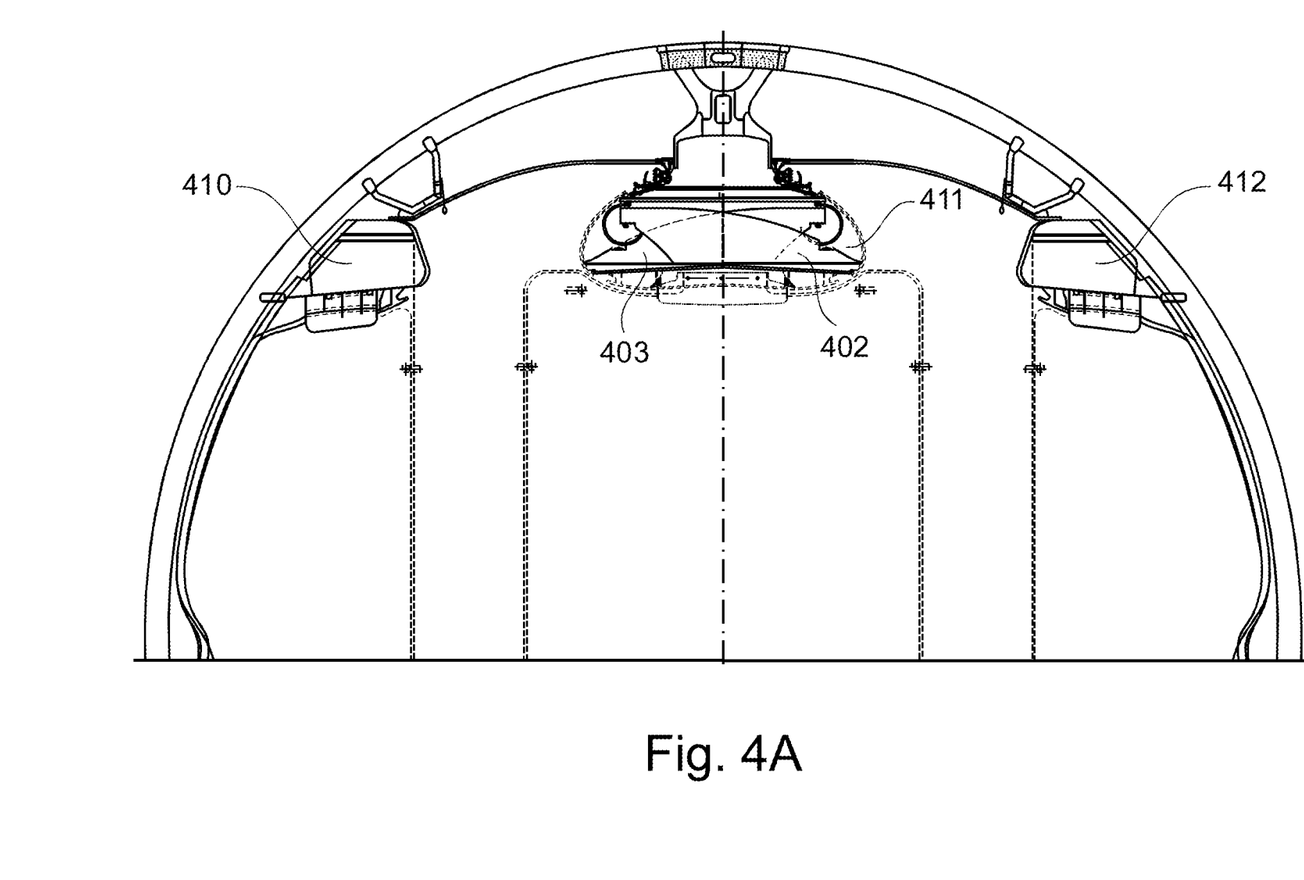
FIG. 4A shows luggage compartments in a passenger cabin according to an exemplary embodiment.

FIG. 4A shows overhead hatracks 410, 411, 412 of a passenger cabin of a means of transport. The center overhead hatrack 411 comprises two mounting modules 402, 403 of the type of the embodiments.

The mounting modules of the mounting devices can be pushed into the overhead hatrack 411 so that the entire mounting devices are located within the hatrack, in other words they form an integral part of the center hatrack. If required, the mounting module (header panel) is pulled from the hatrack. In a rail-guided manner there is in addition a movement in the positive Z-direction 406 (see FIG. 4B) before the mounting module has arrived in its end position below the cabin ceiling where it is locked. If the mounting module is not used, it is unlocked and pushed back into the hatrack. During both movements the curtain can remain hooked-in on the mounting module, and during the fold-in movement is subsequently folded and stowed away in the hatrack.

Integration of the mounting device within the hatrack when not in use may provide many advantages. On the one hand the gathered curtain is stowed away and visibility within the cabin is thus not impeded. Since the mounting module, too, is hidden in the hatrack when not in use, visibility in the cabin is additionally improved. Furthermore, in this way the cabin design can be more aesthetically pleasing, and visibility along the entire cabin opens up. It is then possible to do away with special solutions, also referred to as curtain housing arrangements, such as the slit arrangement or recess 6 in the installation element 5, as shown in FIG. 3, which slit arrangement or recess 6 can receive the curtain. Moreover, there is then adequate space for add-on parts such as baby bassinets LCDs, etc.

Figure 4B:
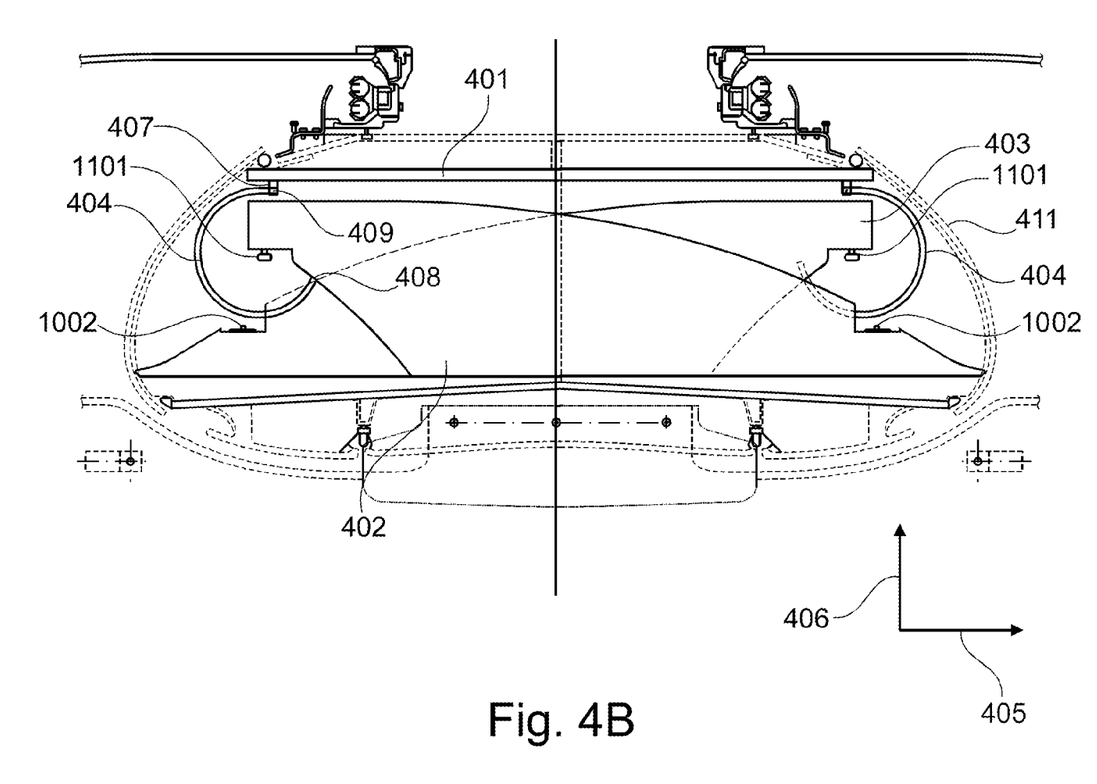
FIG. 4B shows a detailed view of the center luggage compartment of FIG. 4A.

FIG. 4B shows a detailed view of the center hatrack 411 of FIG. 4A. The two mounting modules 402, 403 are held on a common rail 401, or in each case on a dedicated rail so as to be slidable in the Y-direction 405. The rail 401 is attached to the upper area of the hatrack 411.

The first mounting module 402 can be pulled out towards the right-hand side, and the second mounting module 403 can be pulled out towards the left-hand side from the hatrack. Then a movement with a component in the positive Z-direction 406 commences until the mounting module has finally arrived in the corresponding arresting elements in the lateral area and in the center area, where it is secured in this position.

Each of the mounting modules 402, 403 is attached to the rail by means of a coupling device 404 of its own, which is a type of pivot joint with a slide 407 that is guided in the rail 401. The pivot joint 404 comprises, for example, two rotation axes where one rotation axis 408 is used to attach the coupling device to the mounting module, and the other rotation axis 409 is used to attach the coupling device to the slide 407.

If the mounting module together with the curtain is to be stowed away again in the hatrack because these two elements are not used at the time, consecutively the center arresting element 1101 and the lateral arresting element 1002 are undone. The mounting module can then be moved in the negative Z-direction. When the Z-movement has finished, the mounting module can be slid back, in the negative Y-direction, into the hatrack 411. This area is closed off by a corresponding hatrack sliding door.

Figure 5:
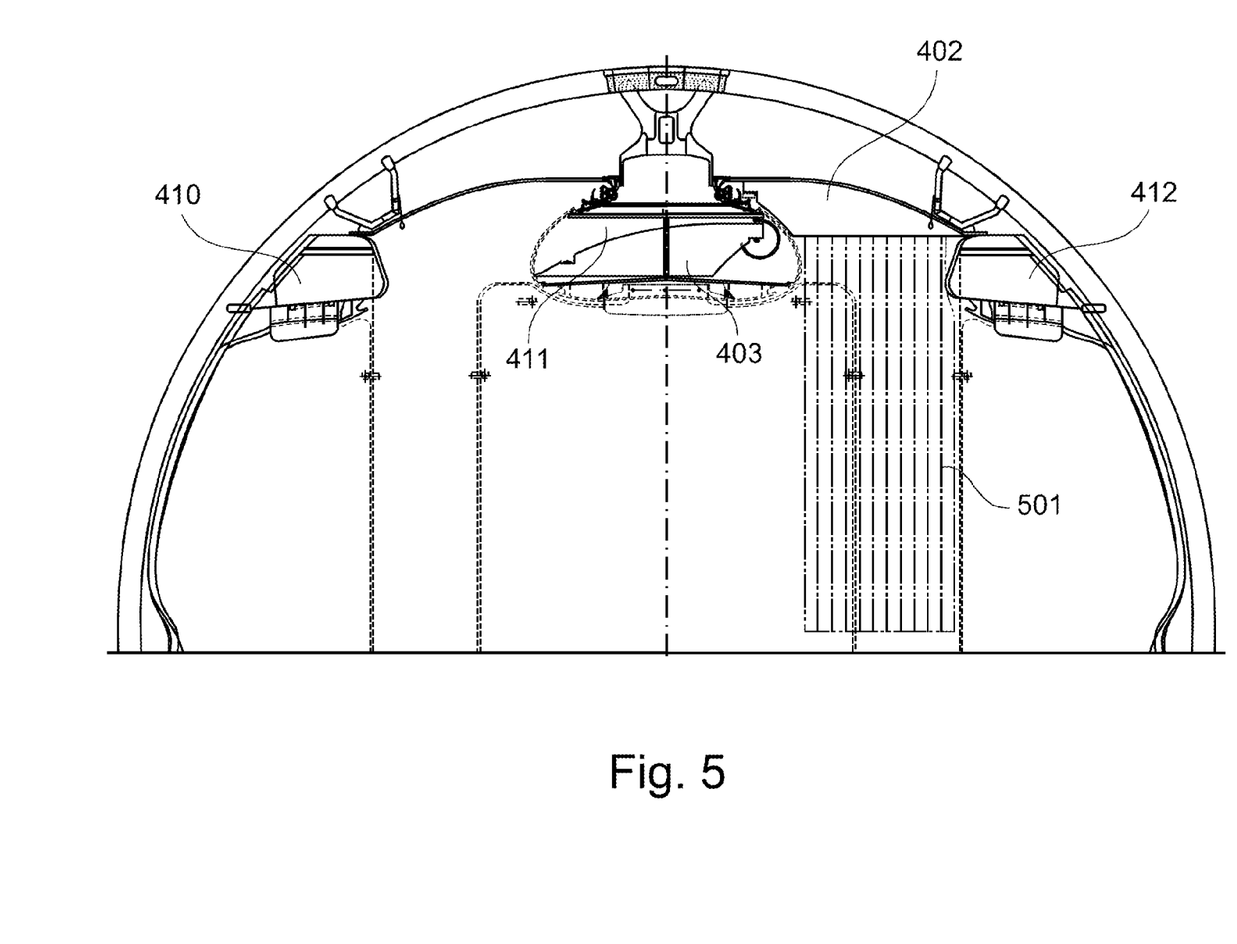
FIG. 5 shows the luggage compartments of FIG. 4A in a first state.

FIG. 5 shows a cross-sectional view of a cabin of a means of transport, for example of an aircraft cabin, with a mounting module 403 that has been folded into the center hatrack 411, and with a mounting module 402 that has been folded out on the right-hand side, with a curtain 501 affixed thereto.

Figure 6:
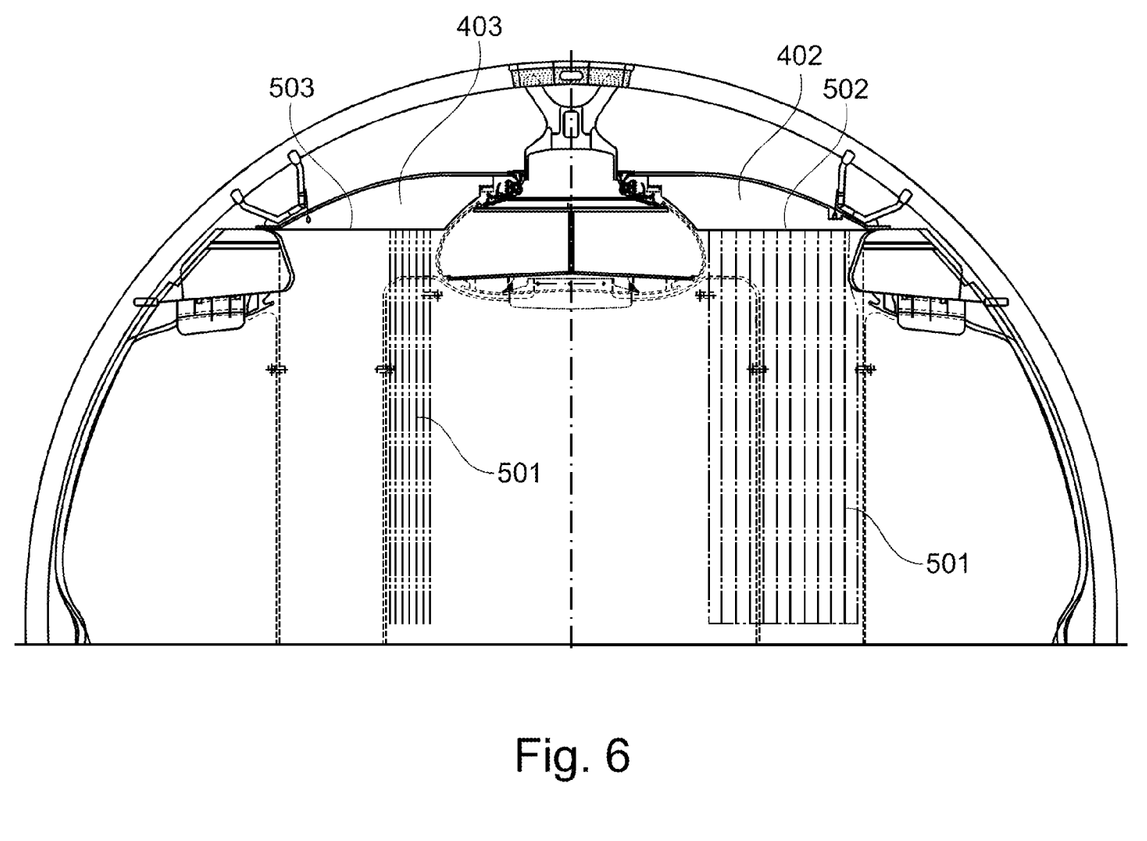
FIG. 6 shows the luggage compartments of FIG. 4A in a second state.

FIG. 6 shows a cross-sectional view of the cabin of a means of transport of FIG. 5, wherein both mounting modules 402, 403 are shown in their folded-out end positions. The mounting module 402 shown right in FIG. 6 comprises a curtain rod 502 along which the right curtain 501 is slidable. The mounting module 403 shown left in FIG. 6 comprises a curtain rail 503 along which the left curtain 501 is slidable.

Figure 7:
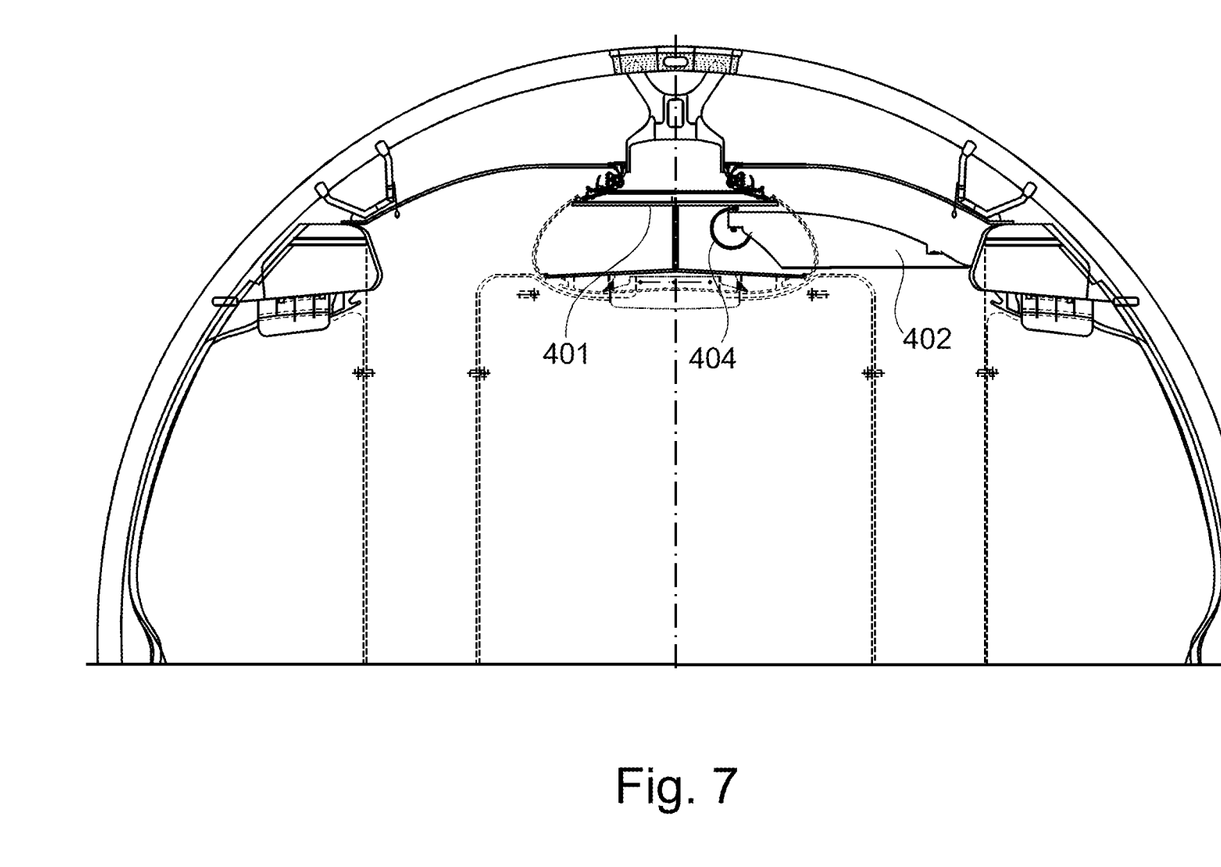
FIG. 7 shows luggage compartments with a partially extended mounting module.

FIG. 7 shows the manner in which mounting module 402 is pushed, from its retracted position, out of the hatrack housing in the Y-direction towards the outside.

The mounting module 402 is attached to the rail 401 merely by means of the coupling device 404; it can be manually pulled out of the overhead hatrack 411.

Figure 8:
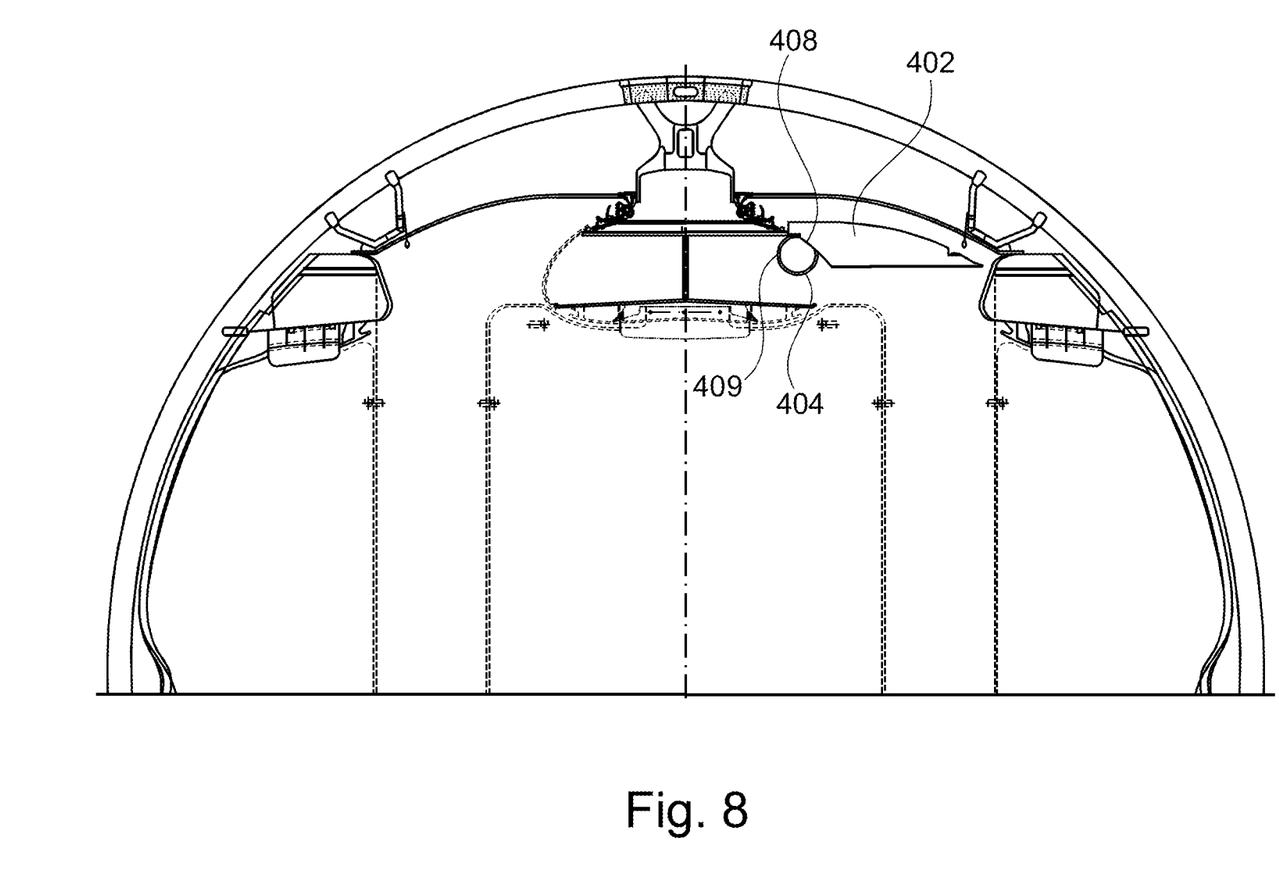
FIG. 8 shows the luggage compartments of FIG. 7 in another state.

FIG. 8 shows the manner in which thereafter the mounting module 402 is pivoted upwards. To this effect the coupling device 404 comprises two rotation axes 408, 409. When this pivoting movement, which comprises a component in the positive Z-direction, has been completed, the mounting module when it reaches the end position is arrested, for example, automatically, laterally and in the area of the center aisle (see FIG. 9).

Figure 9:
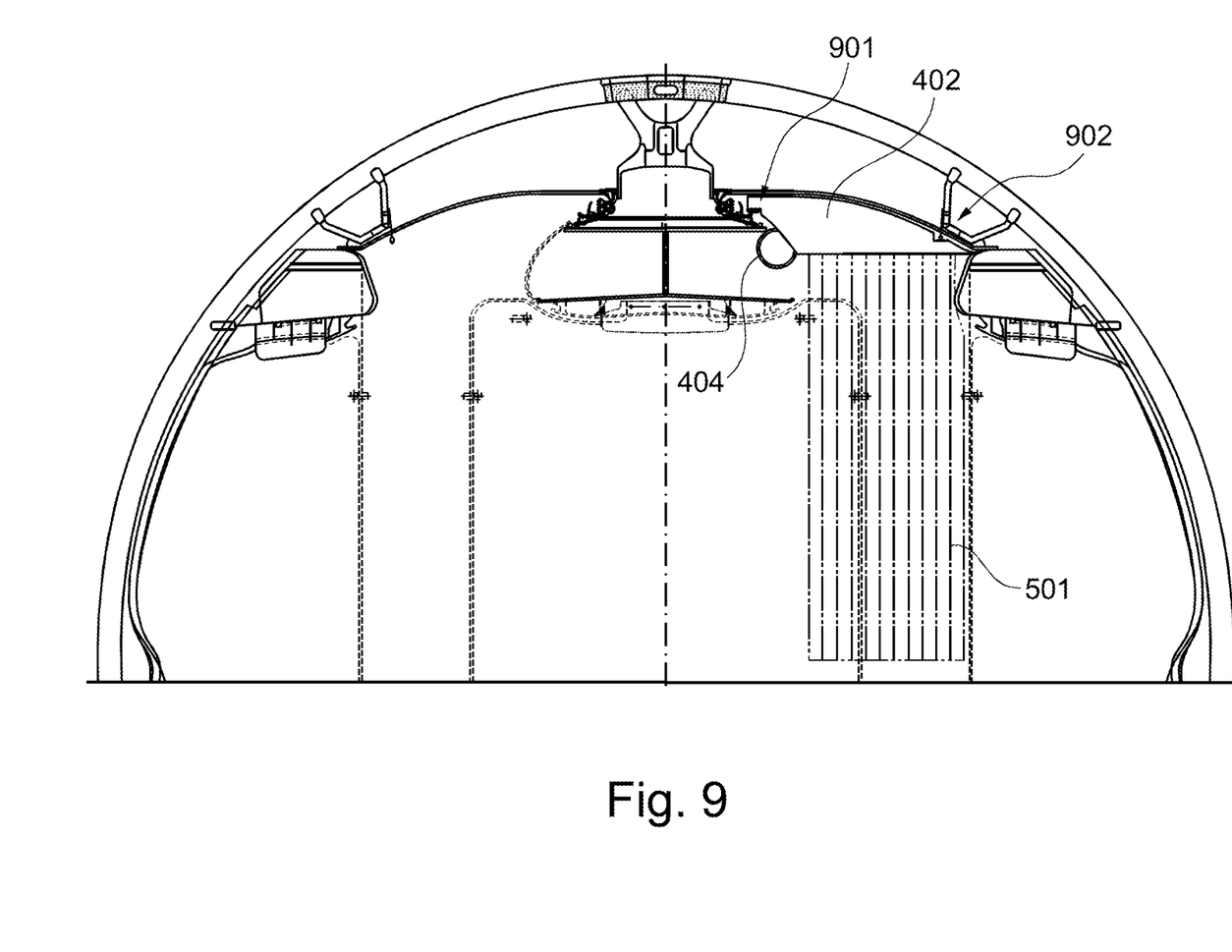
FIG. 9 shows the luggage compartments of FIG. 7 with a mounting module in the end position.

To this effect a center arresting device in the area of the center aisle 901, and a lateral arresting device in the area of the starboard side 902 are provided.

Figure 10:
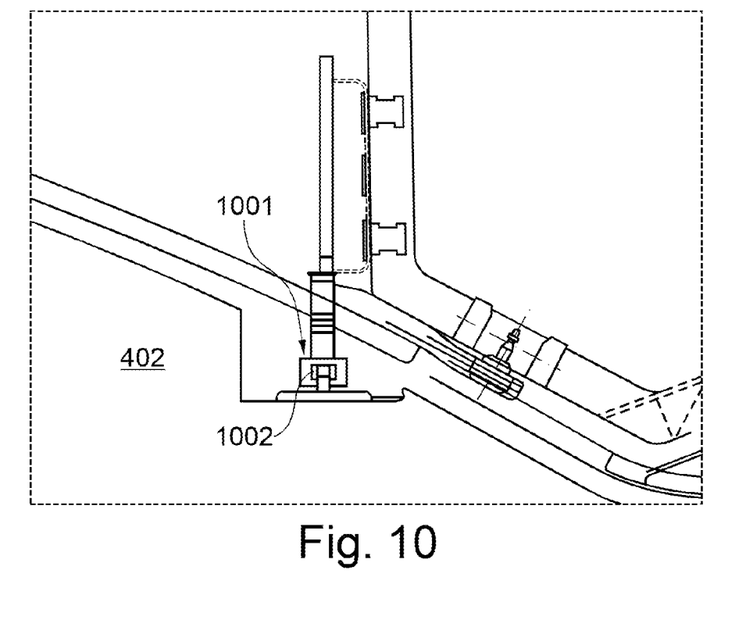
FIG. 10 shows an arresting device according to an exemplary embodiment.
Figure 11:
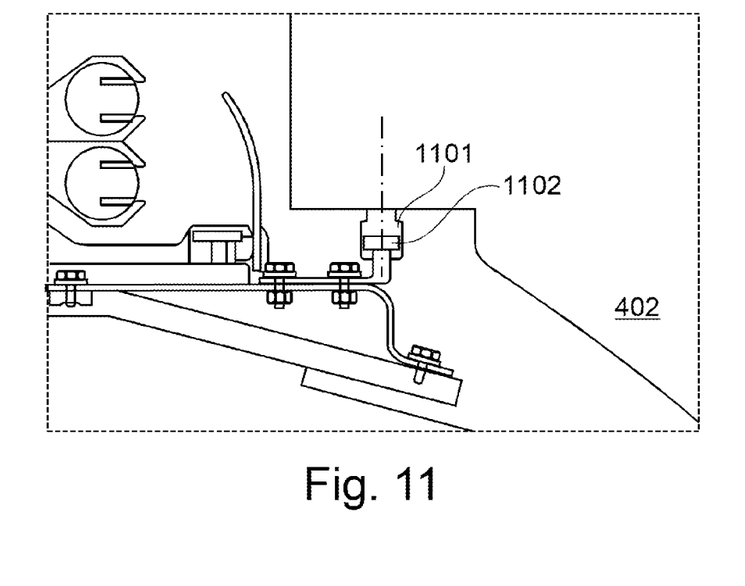
FIG. 11 shows a further arresting device according to an exemplary embodiment.

These two arresting devices are shown in greater detail in FIG. 10 and FIG. 11.

FIG. 10 shows a lateral arresting device arranged on the side of the mounting module, which side faces the outside of the cabin. A compression-spring-loaded bolt 1002 is attached to the mounting module 402, which bolt 1002 faces in the positive Z-direction and during upwards movement of the mounting module 402 towards its extended end position is inserted into the corresponding receiving bush 1001 thus fixing the mounting module. The receiving bush 1001 is, for example, attached to the load-bearing structure of the passenger cabin.

FIG. 11 shows the center arresting device which also comprises a compression-spring-loaded bolt 1102 that interacts with a corresponding receiving bush 1101 when the mounting module is moved to its extended end position. In this case the receiving bush 1101 is attached to the other side of the mounting module, which is the side facing the center of the passenger cabin. The receiving bush points downwards (in the negative Z-direction) and during locking is moved downwards. This movement is made possible by the coupling device 404 that comprises two rotation axes for this purpose.

On the passenger cabin a corresponding compression-spring-loaded bolt 1102 is arranged that during this movement engages the receiving bush and thus affixes the mounting module of a passenger cabin.

Of course it is also possible that in the case of FIG. 10 the receiving bush is attached to the mounting module, and that the compression-spring-loaded bolt is attached to the passenger cabin, and/or, that in the case of FIG. 11, for example, the compression-spring-loaded bolt is attached to the mounting module, and the receiving bush is attached to the passenger cabin.

Figure 12:
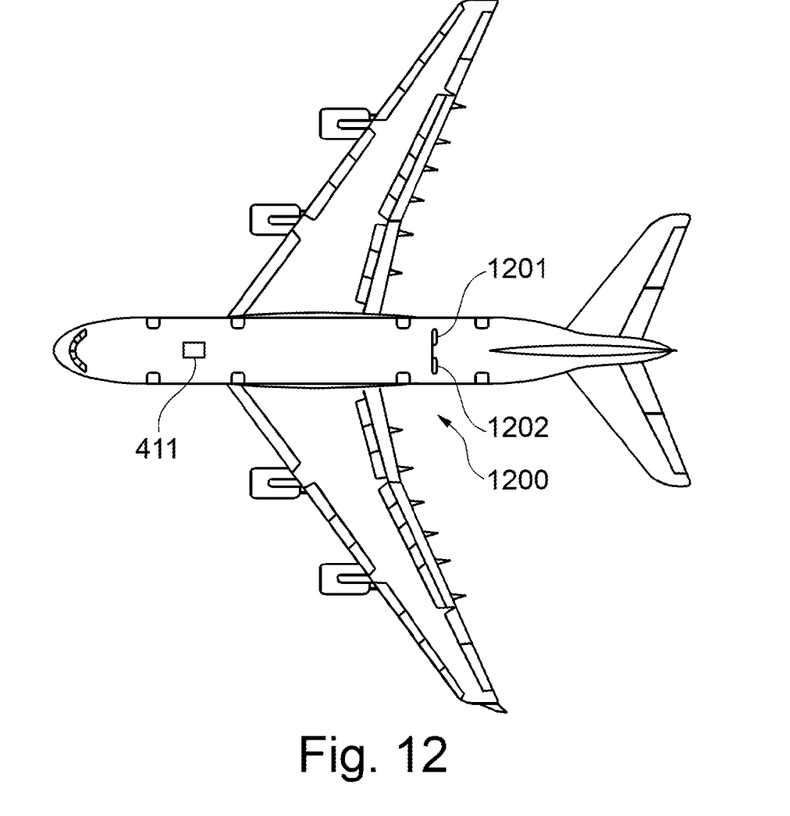
FIG. 12 shows an aircraft according to an exemplary embodiment.

FIG. 12 shows an aircraft 1200 with a hatrack 411 according to an exemplary embodiment. Furthermore, mounting devices 1201, 1202 are provided that are not integrated in a hatrack 411.

Figure 13:
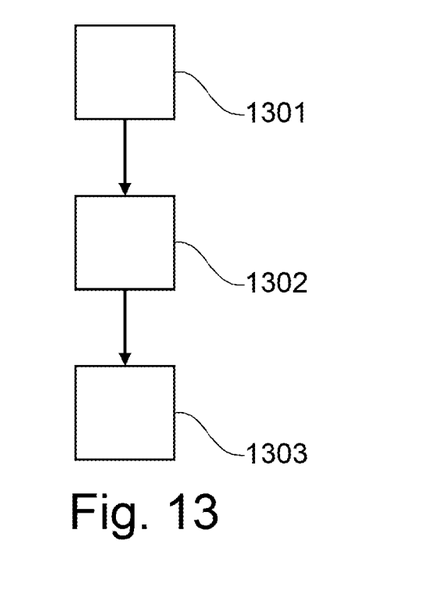
FIG. 13 shows a flow chart of a method according to an exemplary embodiment.

FIG. 13 shows a flow chart of a method according to an exemplary embodiment. In step 1301 sliding of the mounting module from a retracted position along a longitudinal axis of the rail takes place. In step 1302 moving the mounting module after sliding to an extended position along a direction that does not extend along the longitudinal axis of the rail takes place, and in step 1303 affixing the mounting module in its extended position takes place. In a further step this affixation can be undone, after which return movement of the mounting module from its extended position along a direction that does not extend along the longitudinal axis of the rail takes place. Thereafter, sliding back the mounting module to its retracted position can take place.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A mounting device for mounting a visual barrier of two areas of a passenger cabin of a transport, the mounting device comprising:
   a rail;
   a coupling device; and
   a mounting module configured for mounting the visual barrier,
   wherein the mounting module is movably attached to the rail with the coupling device so that the mounting module is configured to carry out a sliding movement from a retracted position along a longitudinal axis of the rail, and
   wherein the mounting module is configured with the coupling device, to carry out a movement after sliding, which movement after sliding does not take place along the longitudinal axis of the rail, and which movement after sliding ends in an extended position of the mounting module.

2. The mounting device of claim 1, wherein the mounting module comprises a curtain rod along which the visual barrier is slidable.

3. The mounting device of claim 1, wherein the mounting module comprises a curtain rail along which the visual barrier is slidable.

4. The mounting device of claim 1,
   wherein the coupling device comprises a first area that is configured to hold the coupling device to the rail and guide the coupling device along the rail when the sliding movement takes place, and
   wherein the coupling device comprises a second area configured to pivotably hold the mounting module to the coupling device.

5. The mounting device of claim 1, wherein the coupling device comprises two pivot joints that are configured for enabling the mounting module to move after sliding.

6. The mounting device of claim 1, further comprising:
   a first arresting element and a second arresting element for affixing the mounting module to a component of the passenger cabin when the mounting module is in the extended position.

7. A luggage compartment for a passenger cabin of a transport, comprising:
   a visual barrier of two areas of the passenger cabin; and
   a mounting device configured to mount the visual barrier, the mounting device comprising:
   a rail;
   a coupling device; and
   a mounting module configured for mounting the visual barrier,
   wherein the mounting module is movably attached to the rail with the coupling device so that the mounting module is configured to carry out a sliding movement from a retracted position along a longitudinal axis of the rail, and
   wherein the mounting module is configured with the coupling device, to carry out a movement after sliding, which movement after sliding does not take place along the longitudinal axis of the rail, and which movement after sliding ends in an extended position of the mounting module.

8. The luggage compartment of claim 7, wherein the rail is integrated in the luggage compartment.

9. The luggage compartment of claim 7, wherein the rail is attached to an upper area of the luggage compartment.

10. The luggage compartment of claim 7, wherein the mounting device in the retracted position is entirely located within the luggage compartment.

11. The luggage compartment of claim 7 further comprising a closable opening through which the mounting module is moved from the retracted position within the luggage compartment to the extended position.

12. The luggage compartment of claim 11, wherein the closable opening comprises a sliding door configured to close the closable opening.

13. The luggage compartment claim 7, wherein the luggage compartment is a center overhead bin arranged between two aisles of the passenger cabin.

14. A transport, comprising:
   a passenger cabin;
   a luggage compartment for the passenger cabin;
   a visual barrier of two areas of the passenger cabin; and
   a mounting device configured to mount the visual barrier, the mounting device comprising:
   a rail;
   a coupling device; and
   a mounting module configured for mounting the visual barrier,
   wherein the mounting module is movably attached to the rail with the coupling device so that the mounting module is configured to carry out a sliding movement from a retracted position along a longitudinal axis of the rail, and wherein the mounting module is configured with the coupling device, to carry out a movement after sliding, which movement after sliding does not take place along the longitudinal axis of the rail, and which movement after sliding ends in an extended position of the mounting module.

15. The transport of claim 14, wherein the transport is an aircraft.

16. A method for mounting a visual barrier of two areas of a passenger cabin of a transport with the visual barrier affixed to a mounting device, the mounting device comprising:

a rail;

a coupling device; and a mounting module configured for mounting the visual barrier, wherein the mounting module is movably attached to the rail with the coupling device so that the mounting module is configured to carry out a sliding movement from a retracted position along a longitudinal axis of the rail, and wherein the mounting module is configured with the coupling device, to carry out a movement after sliding, which movement after sliding does not take place along the longitudinal axis of the rail, and which movement after sliding ends in an extended position of the mounting module, the method comprising:

sliding the mounting module from the retracted position along the longitudinal axis of the rail;

moving the mounting module, after the sliding, to the extended position along a direction that does not extend along the longitudinal axis of the rail; and affixing the mounting module in the extended position.

* * * * *